(12) United States Patent
Fulton

(10) Patent No.: US 10,101,871 B2
(45) Date of Patent: Oct. 16, 2018

(54) COMPENSATION MANAGEMENT SYSTEM

(71) Applicant: ADP, LLC, Roseland, NJ (US)

(72) Inventor: Keith Wilson Fulton, South Orange, NJ (US)

(73) Assignee: ADP, LLC, Roseland, NJ (US)

( * ) Notice: Subject to any disclaimer, the term of this patent is extended or adjusted under 35 U.S.C. 154(b) by 404 days.

(21) Appl. No.: 14/613,467

(22) Filed: Feb. 4, 2015

(65) Prior Publication Data

US 2016/0224205 A1    Aug. 4, 2016

(51) Int. Cl.
*G06F 3/048* (2013.01)
*G06F 3/0481* (2013.01)
*G06Q 10/10* (2012.01)
*G06Q 40/00* (2012.01)
*G06F 3/0484* (2013.01)

(52) U.S. Cl.
CPC ...... *G06F 3/04817* (2013.01); *G06F 3/04842* (2013.01); *G06Q 10/1057* (2013.01); *G06Q 40/125* (2013.12)

(58) Field of Classification Search
None
See application file for complete search history.

(56) References Cited

U.S. PATENT DOCUMENTS

| 7,707,052 B2 | 4/2010 | Kuhn et al. |
| 8,234,153 B2 | 7/2012 | Hecker et al. |
| 2007/0011036 A1* | 1/2007 | Lo .......... G06Q 10/00 705/7.29 |
| 2007/0038542 A1* | 2/2007 | Armstrong ......... G06Q 40/06 705/36 R |
| 2007/0043603 A1* | 2/2007 | Andersen ........... G06Q 10/06 705/7.14 |
| 2009/0254400 A1* | 10/2009 | Lillie ............... G06Q 10/063 705/7.11 |
| 2010/0076821 A1* | 3/2010 | Hecker ............... G06Q 10/06 705/7.42 |
| 2011/0276507 A1* | 11/2011 | O'Malley ........... G06Q 10/00 705/321 |
| 2011/0307303 A1* | 12/2011 | Dutta ............ G06F 17/30539 705/7.42 |
| 2012/0123955 A1* | 5/2012 | Chen ................. G06Q 40/02 705/320 |
| 2012/0311497 A1* | 12/2012 | Bear .................. G06Q 10/00 715/823 |
| 2014/0218383 A1 | 8/2014 | Srivastava |

* cited by examiner

*Primary Examiner* — Claudia Dragoescu
(74) *Attorney, Agent, or Firm* — Yee & Associates, P.C.

(57) ABSTRACT

A method and apparatus for managing compensation on a display system. A computer system displays icons representing employees in a graphical user interface on the display system. The icons are positioned relative to each other and along a compensation axis and positions of the icons relative to each other indicate relative amounts of compensation between the employees. The computer system also displays a compensation change for an employee in the employees on the display system when an icon for the employee is moved along the compensation axis.

21 Claims, 13 Drawing Sheets

COMPENSATION MANAGEMENT SYSTEM

BACKGROUND INFORMATION

1. Field

The present disclosure relates generally to data processing systems, and in particular, to a compensation management tool in a data processing system. Still more particularly, the present disclosure relates to a method and apparatus for managing compensation in an organization.

2. Background

Employees are a major asset of an organization. Hiring and retaining employees involves many different factors including compensation, work environment, geographic location, and other factors. Compensation is a major factor for many employees. Providing compensation within an organization that is competitive with other organizations is important to hiring and retaining employees in an organization. These organizations may take various forms, such as, for example, a company, a partnership, a city, a charitable organization, a government agency, or some other type of organization that has employees.

Identifying an appropriate level of compensation is a challenging process for many organizations. Organizations employ various tools to identify what the organizations consider to be appropriate compensation for employees. For example, an organization may perform reviews on a yearly basis. These reviews may include factors such as performance, talent, potential growth, and other suitable factors. Meetings may be held with employees to present and discuss these reviews.

Additionally, market demand for employees with certain skills or for selected positions also factor into identifying an amount of compensation. The compensation of employees in other organizations with similar backgrounds and positions may be identified from studies or surveys. Additionally, consulting firms may provide information used to set compensation within the organization.

Budgets for departments, value of the employee to the company, performance, and other factors also may be taken into account in setting the compensation for employees. In many cases, the performance and the value of the employee within the organization may be a major factor in setting the compensation as compared to other factors.

Currently, comparing the performance and other factors of employees within the organization is often more difficult and time-consuming than desired. The compensation and information about performance may be reviewed in reports generated as part of a review process. Further, this information also may be entered into spreadsheets that can be viewed when setting compensation. Viewing reports and spreadsheets, however, may be more difficult than desired when an organization has large numbers of employees.

Therefore, it would be desirable to have a method and apparatus that take into account at least some of the issues discussed above, as well as other possible issues. For example, it would be desirable to have a method and apparatus that enables visualization of compensation information to reduce the difficulty and complexity in setting levels of compensation.

SUMMARY

In one illustrative embodiment, a computer system comprises a display system and a compensation tool in the computer system. The compensation tool is in communication with the display system. The compensation tool displays icons representing employees in a graphical user interface on the display system. The icons are positioned relative to each other and along a compensation axis and positions of the icons relative to each other indicate relative amounts of compensation between the employees and displays a compensation change for an employee in the employees on the display system when an icon for the employee is moved along the compensation axis. The compensation tool increases an ability to visualize employee information for setting compensation.

In another illustrative embodiment, a method for managing compensation on a display system is presented. A computer system displays icons representing employees in a graphical user interface on the display system. The icons are positioned relative to each other and along a compensation axis and positions of the icons relative to each other indicate relative amounts of compensation between the employees. The computer system also displays a compensation change for an employee in the employees on the display system when an icon for the employee is moved along the compensation axis.

In yet another illustrative embodiment, a computer program product for displaying compensation on a display system comprises a computer readable storage media, first program code stored on the computer readable storage media, and second program code stored on the computer readable storage media. The first program code displays icons representing employees in a graphical user interface on the display system by a computer system. The icons are positioned relative to each other and along a compensation axis and positions of the icons relative to each other indicate relative amounts of the compensation between the employees. The second program code displays a compensation change for an employee in the employees on the display system when an icon for the employee is moved along the compensation axis.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that currently available tools used in setting compensation for employees may be more cumbersome and difficult than desired. Reports, even in electronic form, may be numerous and difficult to provide a desired visualization of the compensation of different employees in an organization. Further, spreadsheets may provide some organization of the information and provide charts or graphs of information. Spreadsheets, however, may not provide a desired level of flexibility in visualizing the information needed to set levels of compensation for employees.

For example, the illustrative embodiments recognize and take into account that currently available tools do not provide a visualization of compensation between different employees in an organization in a desired manner. In particular, the illustrative embodiments recognize and take into account that comparing employees to each other using spreadsheets is often more difficult than desired.

Further, the illustrative embodiments also recognize and take into account that currently available tools are unable to provide a visualization of how changes in compensation for an employee affect the compensation of employees relative to other employees. Thus, it would be desirable to have a method, apparatus, system, and computer program product that overcome issues with visualizing information about the employees needed to set compensation for the employees.

The illustrative embodiments provide a method, apparatus, system, and computer program product for visualizing compensation on a display system that overcome the issues with visualization comprehension present with currently available tools. In one illustrative example, a computer system displays icons representing employees in a graphical user interface on the display system. The icons are positioned relative to each other and along a compensation axis, and a position of the icons relative to each other indicates relative amounts of compensation between the employees. The computer system also displays a compensation change for an employee in the employees on the display system when an icon for the employee is moved along the compensation axis.

In this manner, the computer system is a special purpose computer system that increases the ability to provide visualizations of information about employees on a display system. These visualizations increase the speed in which information may be analyzed and comprehended to set compensation for employees.

The compensation set using the visualizations may then be used in compensating employees. For example, one or more of pay, health insurance, life insurance, vacation, stock options, or other forms of compensation may be set for employees based on the visualizations.

Figure 1:
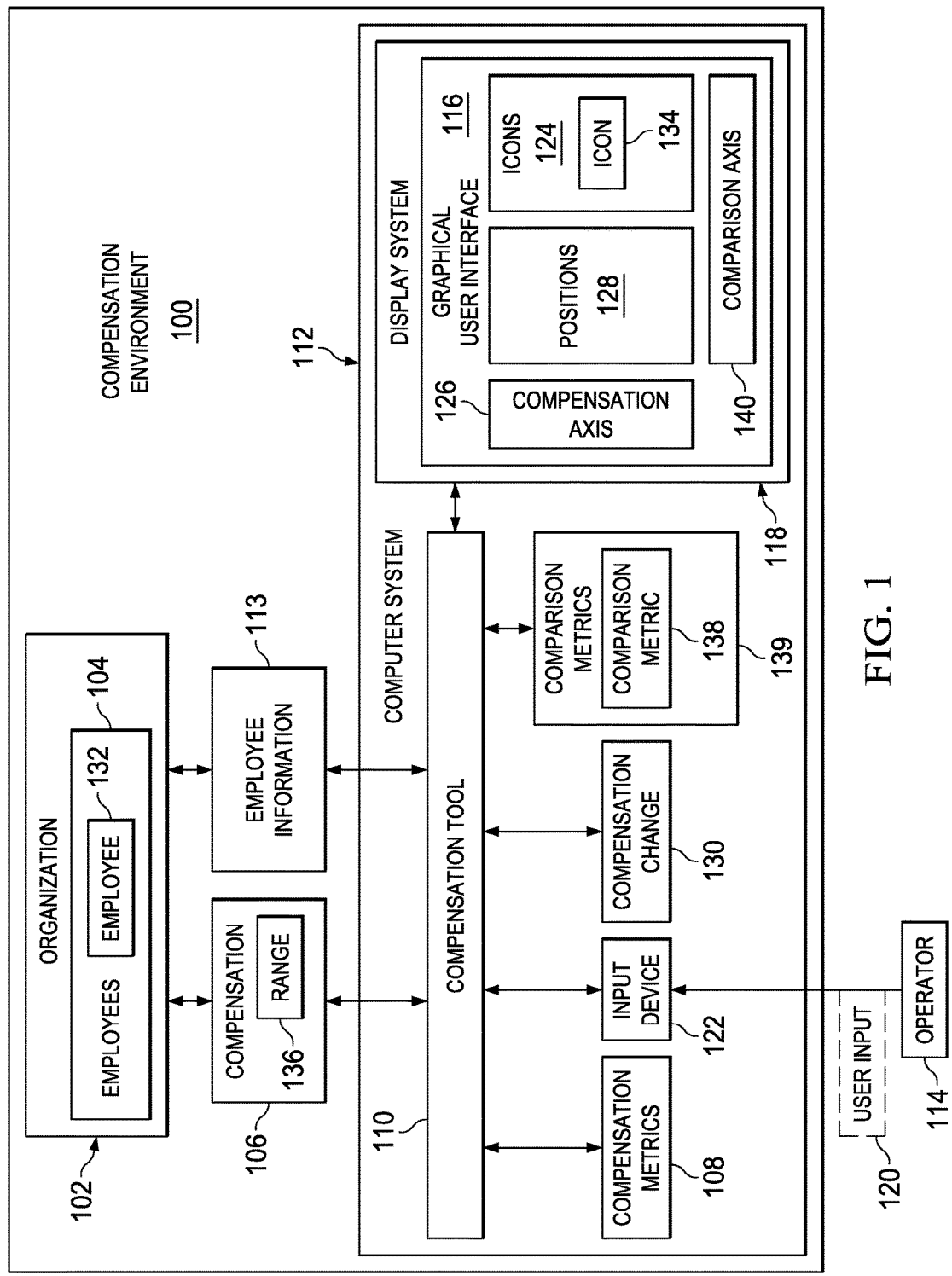
FIG. 1 is an illustration of a block diagram of a compensation analysis environment in accordance with an illustrative embodiment.

With reference now to the figures and, in particular, with reference to FIG. 1, an illustration of a block diagram of a compensation analysis environment is depicted in accordance with an illustrative embodiment. As depicted, compensation environment 100 is an environment in which organization 102 has employees 104.

As depicted, employees 104 receive compensation 106. Compensation 106 may be measured in a number of different ways. For example, compensation 106 may include at least one of a monthly pay, an hourly wage, a total yearly compensation, vacation days, a bonus, an award, health insurance, life insurance, or other benefits.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, compensation 106 may be set for employees 104 based on compensation metrics 108. Compensation metrics 108 may include at least one of seniority, talent, potential growth, performance, experience, location, amount of compensation change received over a specified time period, amount of time since receiving a compensation change, or a pay grade.

In the illustrative example, setting compensation 106 for employees 104 may be performed using compensation tool 110. Compensation tool 110 may be implemented in software, hardware, firmware or a combination thereof. When software is used, the operations performed by compensation tool 110 may be implemented in program code configured to run on hardware, such as a processor unit. When firmware is used, the operations performed by compensation tool 110 may be implemented in program code and data and stored in persistent memory to run on a processor unit. When hardware is employed, the hardware may include circuits that operate to perform the operations in compensation tool 110.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, compensation tool 110 may be implemented in computer system 112. Computer system 112 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, an electronic flight bag, a mobile phone, or some other suitable data processing system.

As depicted, compensation tool 110 provides a visualization of employee information 113 in a manner that allows operator 114 to set compensation 106 for employees 104. Employee information 113 may include any information about employees 104.

Employee information 113 may also include at least one of seniority, talent, potential growth, performance, experience, location, a pay grade, a monthly pay, an hourly wage, a total yearly compensation, vacation days, a bonus, health insurance, life insurance, a job title, a job description, an address, an education level, or other information about employees 104. The visualization is provided in graphical user interface 116 on display system 118.

Operator 114 may be a user such as a manager, a human resources person, or some other suitable user. Display system 118 is a hardware system and includes one or more display devices on which graphical user interface 116 may be displayed.

In this illustrative example, operator 114 may interact with graphical user interface 116 through user input 120 generated by input device 122 in computer system 112. Input device 122 may be, for example, a mouse, a keyboard, a trackball, a touchscreen, or some other suitable type of input device.

As depicted, compensation tool 110 in computer system 112 is in communication with display system 118. Compensation tool 110 displays icons 124 representing employees 104 in graphical user interface 116 on display system 118. In the illustrative example, icons 124 are positioned relative to each other and along compensation axis 126. The positions of icons 124 along compensation axis 126 mean icons 124 are positioned relative to compensation axis 126. This positioning is made to one side of compensation axis 126, on compensation axis 126, or some combination thereof.

Positions 128 of icons 124 relative to each other in graphical user interface 116 indicate relative amounts of compensation 106 between employees 104 represented by icons 124. Compensation tool 110 displays compensation change 130 for employee 132 in employees 104 on display system 118 when icon 134 for employee 132 in icons 124 is moved along compensation axis 126.

In this illustrative example, icon 134 is a visual indication representing employee 132 in graphical user interface 116. Icon 134 may be any visual indicator and may be selected from one of a pictogram, a symbol, a marker, a word, a photo or any other visual indication of a location in graphical user interface 116.

In this illustrative example, in displaying icons 124 representing employees 104 in graphical user interface 116, compensation tool 110 identifies compensation 106 for employees 104 and displays icons 124 for employees 104 along compensation axis 126 based on compensation 106 identified for employees 104.

In particular, in displaying icons 124 representing employees 104, compensation tool 110 identifies range 136 of compensation 106 for compensation axis 126 based on compensation 106 that is current for employees 104. Compensation tool 110 displays icons 124 at positions 128 along compensation axis 126 having range 136 based on compensation 106 for employees 104.

Additionally, compensation tool 110 also may identify comparison metric 138 in comparison metrics 139 to compare employees 104 to each other. In this illustrative example, comparison metrics 139 may include at least one of seniority, talent, potential growth, performance, experience, location, amount of compensation change received over a specified time period, amount of time since receiving a compensation change, pay grade, or some other suitable metrics that may be used to compare employees 104 to each other in setting compensation 106.

In displaying icons 124 in positions 128 in graphical user interface 116, compensation tool 110 displays icons 124 relative to comparison axis 140. As depicted, comparison axis 140 indicates relative values for comparison metric 138.

In this illustrative example, comparison axis 140 is substantially perpendicular to compensation axis 126. These axes may or may not be displayed in graphical user interface 116 depending on the particular implementation.

Figure 2:
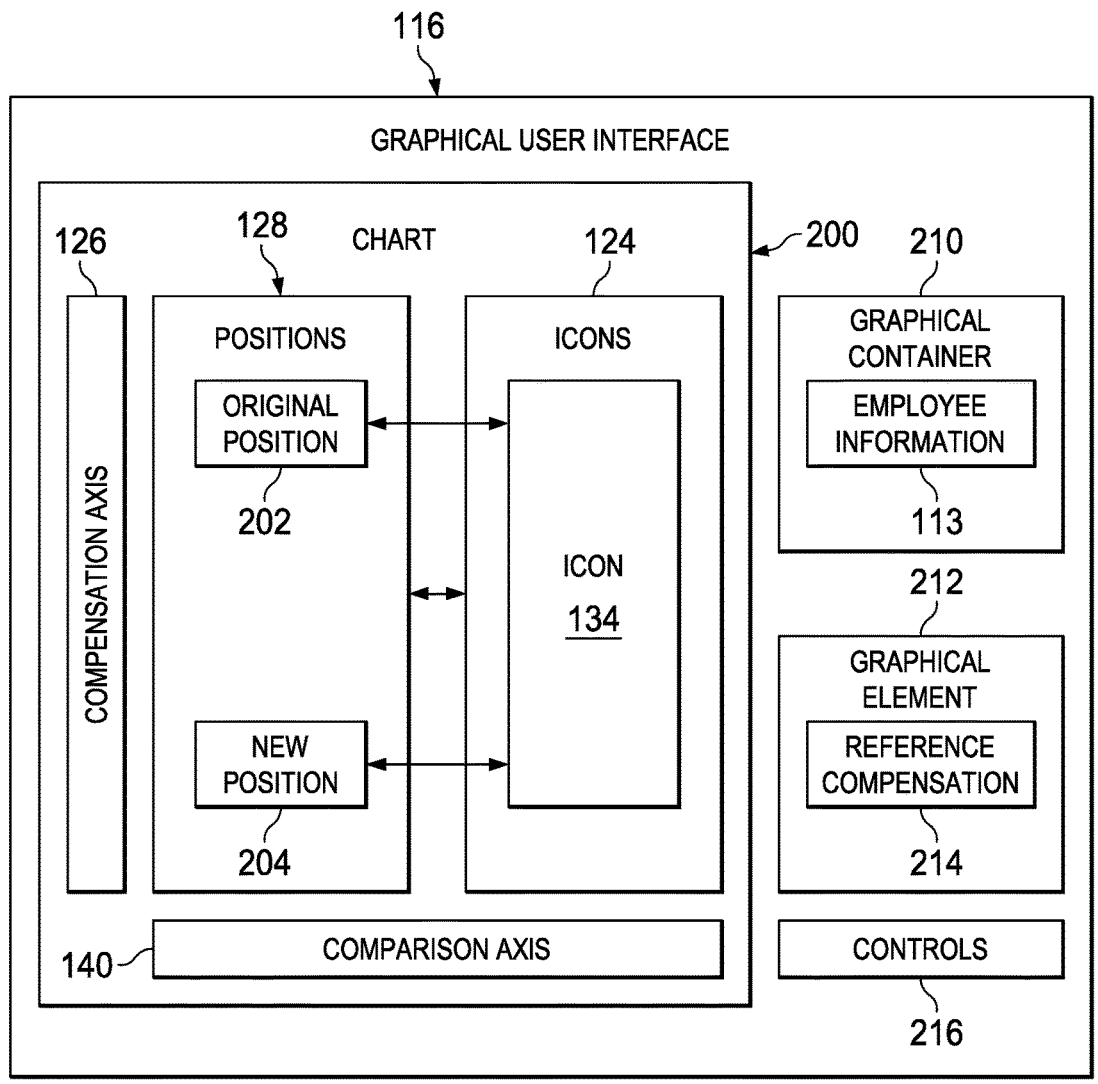
FIG. 2 is an illustration of a block diagram of interactions that may be performed by an operator of a graphical user interface in accordance with an illustrative.

Turning next to FIG. 2, an illustration of a block diagram of interactions that may be performed by an operator of a graphical user interface is depicted in accordance with an illustrative embodiment. In the illustrative examples, the same reference numeral may be used in more than one FIGURE. This reuse of a reference numeral in different FIGURES represents the same element in the different FIGURES.

In this illustrative example, compensation tool 110 in FIG. 1 displays icons 124 for employees 104 on chart 200 in graphical user interface 116 in positions 128 relative to compensation axis 126 and comparison axis 140 in chart 200. As depicted, compensation axis 126 is a y-axis and comparison axis 140 is an x-axis.

Chart 200 is a graphical representation of information. In particular, the information may be employee information 113. In this illustrative example, the graphical representation of information is compensation for a comparison metric in displaying icons 124 in chart 200.

During operation of compensation tool 110 in FIG. 1, operator 114 may interact with the display of icons 124 in graphical user interface 116. As depicted, user input 120 in FIG. 1 may manipulate one or more of icons 124 displayed in graphical user interface 116. The manipulation may include at least one of selecting, moving, or other manipulations of icons 124.

For example, icon 134 in icons 124 displayed in graphical user interface 116 may be moved from original position 202 to new position 204 in graphical user interface 116. Icon 134 represents employee 132 in employees 104 in FIG. 1. Original position 202 is the position of icon 134 displayed in graphical user interface 116 based on compensation 106 for employee 132 in FIG. 1. New position 204 is a position in graphical user interface 116 that icon 134 is moved to from original position 202 based on user input 120 in FIG. 1.

The movement of icon 134 may be performed using various types of user input 120 in FIG. 1. For example, user input 120 may be selected from at least one of a drag-and-drop, a gesture, a keystroke or some other suitable type of user input. The movement of icon 134 may be along compensation axis 126.

In another illustrative example, icons 124 also may be manipulated by being selected through user input 120 in FIG. 1. For example, user input 120 may select a group of icons 124 displayed in graphical user interface 116. As used herein, "a group of," when used with reference to items, means one or more items. For example, a group of icons 124 is one or more of icons 124. In this manner, a movement of a group of icons 124 may be made in a similar fashion to the movement of icon 134 to change compensation 106 in FIG. 1 for the group of employees 104 represented by the group of icons 134.

In response to the selection of the group of icons 124, compensation tool 110 in FIG. 1 displays employee information 113 about the group of employees 104 in graphical user interface 116. The group of employees 104 is particular ones of employees 104 that correspond to the group of icons 124 displayed in graphical user interface 116 on display system 118 in FIG. 1.

As depicted, employee information 113 may be displayed in graphical user interface 116 in a number of different ways. For example, employee information 113 may be displayed in graphical container 210. Graphical container 210 is a container in which employee information 113 may be displayed in graphical user interface 116.

Graphical container 210 may be, for example, selected from one of a window, a pop-up window, a tooltip, or some other suitable type of graphical element. In some cases, graphical container 210 may be a window in which the borders of the window are not visible. In this illustrative example, only employee information 113 is visible.

In another illustrative example, compensation tool 110 may display graphical element 212 in graphical user interface 116 on display system 118 in FIG. 1. As depicted, graphical element 212 indicates reference compensation 214 for comparison metric 138 in FIG. 1. Reference compensation 214 may be, for example, a target merit pay, a target pay per employee, a total target pay, an amount of money to be spent on bonuses, target vacation days, and other suitable types of compensation.

In this illustrative example, the targeted item is the desired level or amount for that item. For example, the target pay per employee is the desired pay for an employee.

As depicted, graphical element 212 may be selected from one of a line, an icon, or some other suitable graphical element. The line may be a straight line, a curved line, or some other suitable type of line.

In yet another illustrative example, a group of controls 216 may be displayed in graphical user interface 116. The group of controls 216 may be manipulated or displayed in graphical user interface 116. For example, employees 104 may be a portion of all of the employees in organization 102 in FIG. 1. Employees 104 may be selected based on installation of the group of controls 216. In other words, the group of controls 216 may be used as a filter for employees 104. The filtering of employees 104 is based on at least one of department, location, position, and other suitable parameters.

In still another illustrative example, the group of controls 216 may be used to verify whether to accept compensation change 130 in FIG. 1 when icon 134 is moved from original position 202 to new position 204. User input to the group of controls 216 accepting the compensation change results in compensation change 130 being made effective for employee 132 in FIG. 1. The effective date of compensation change 130 also may be made through the group of controls 216.

In yet another illustrative example, the group of controls 216 may provide a zoom function for viewing icons 124. The zoom function changes the apparent angle of view of the display of at least one of icons 124 or other information displayed in graphical user interface 116. In particular, the function may act to magnify or demagnify the review of icons 124 or other information displayed in graphical user interface 116.

As a result, computer system 112 operates as a special purpose computer system in which compensation tool 110 in computer system 112 enables a visualization of at least one of compensation 106 or compensation metrics 139 for employees 104 in FIG. 1. The manner in which the information for comparison metrics 139 is displayed in graphical user interface 116 on display system 118 in computer system 112 provides a visualization of employee information 113 that allows for at least one of a faster comprehension, a greater level of completeness, and other benefits in reviewing compensation 106, performance metrics, or some combination thereof in generating compensation changes for employees 104. In particular, compensation tool 110 turns computer system 112 into a special purpose computer system as compared to currently available general computer systems that do not have compensation tool 110.

Additionally, computer system 112 with compensation tool 110 performs a transformation of data from a first form for storage in computer system 112 to a second form for visualization by operator 114. Thus, the function of data changes when the format of the data changes. The data may be, for example, employee information 113. In this manner, operator 114 may make decisions about employees 104. The decisions include decisions about compensation 106 for employees 104.

In the illustrative example, compensation tool 110 is a tool that is used by operator 114 to assist in the administration of fair compensation when setting compensation 106 for employees 104. The visualization provided by compensation tool 110 intuitively guides operator 114 to set compensation 106 based on relative performance. Thus, compensation 106 may be set for employees 104 in a manner that is considered to be fair compensation as defined by a policy, standard, or some other mechanism.

The illustration of compensation environment 100 and the different components in this environment in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more of the graphical elements may be displayed in addition to or in place of graphical element 212. These other graphical elements may indicate reference compensations for other metrics or may be based on other parameters. As another illustrative example, compensation tool 110 may be used to set compensation for employees other than employees 104. For example, compensation tool 110 may be used to set compensation for employees over several divisions in a corporation.

As another illustrative example, the group of controls 216 in graphical user interface 116 may include other controls in addition to or in place of the ones depicted in FIG. 2. For example, the group of controls 216 may include at least one of a cancel button, a comparison metric selector, or other suitable controls in addition to or in place of the ones described above.

FIGS. 3-10 illustrate graphical user interfaces and graphical elements that may be used to display employee information 113. The display of employee information 113 is made in a manner to enable setting compensation 106 for employees 104 more easily than with currently used tools or techniques.

Figure 3:
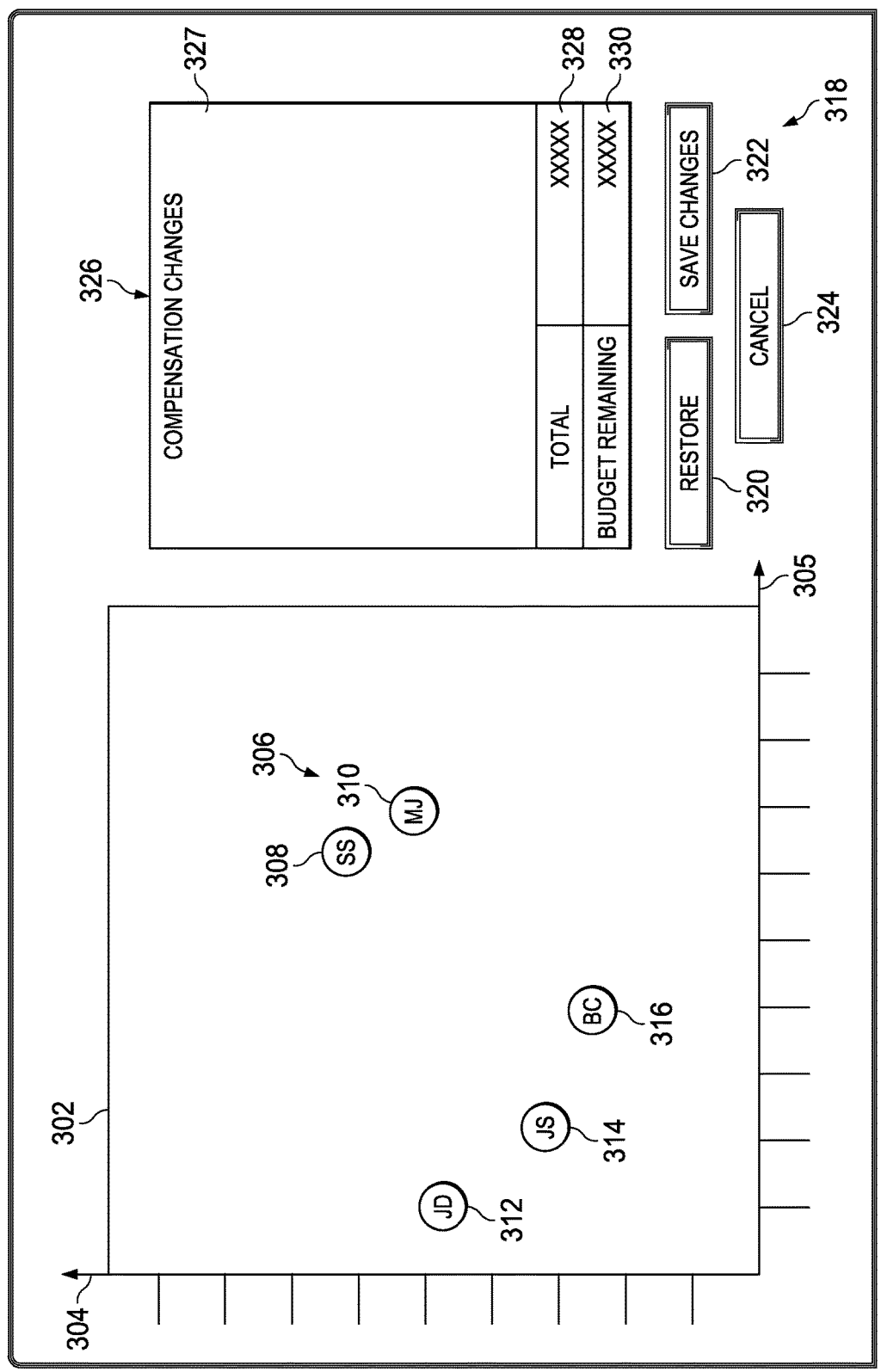
FIG. 3 is an illustration of a graphical user interface for managing compensation in accordance with an illustrative embodiment.

Turning next to FIG. 3, an illustration of a graphical user interface for managing compensation is depicted in accordance with an illustrative embodiment. Graphical user interface 300 is an example of an implementation for graphical user interface 116 shown in block form in FIG. 1 and FIG. 2.

In this illustrative example, chart 302 is displayed in graphical user interface 300. Chart 302 has compensation axis 304 and comparison axis 305. Compensation axis 304 is a y-axis and comparison axis 305 is an x-axis in this illustrative example.

As depicted, icons 306 are displayed in positions relative to each other in chart 302. Icons 306 are circles that include initials that may be used to identify employees. Icons 306 represent employees for whom compensation changes may be made.

As depicted, icons 306 include icon 308, icon 310, icon 312, icon 314, and icon 316. As illustrated, icons 306 are positioned along compensation axis 304 and along comparison axis 305.

In this illustrative example, icons 306 may be moved along compensation axis 304, but are not movable along the comparison axis 305. For example, the particular comparison metric is fixed based on a value for a particular employee. The compensation may be changed for one employee relative to other employees using the particular comparison metric as a guide to gauge where changes should be made.

For example, the comparison metric may be performance. Employees with a particular level of performance may have compensation that is similar to those with similar levels of performance. Chart 302 provides a visualization of the relative amounts of compensation with respect to a comparison metric. The comparison metric may be, for example, performance or some other suitable metric.

In this illustrative example, the employee represented by icon 312 has a higher level of compensation than the employee represented by icon 314. Icon 316 has a lower value for the comparison metric as compared to icon 314 as depicted in this example. As a result, an operator viewing chart 302 may increase the compensation of the employee represented by icon 314 to bring the compensation of that employee closer to or greater than that of the employee represented by icon 312.

In this illustrative example, controls 318 provide different functions for an operator. In this illustrative example, controls 318 include restore button 320, save changes button 322, and cancel button 324. Restore button 320 may undo a prior change. For example, if icon 312 was moved to its current position from another position, that move may be undone using restore button 320. Save changes button 322 may be used save changes that have been made in chart 302. If the operator desires to cancel the process, cancel button 324 may be used.

As depicted, window 326 may display compensation changes made from moving icons 306. The compensation changes are displayed in field 327 in window 326. In this illustrative example, entries are not yet present in field 327 in window 326. The absence of entries in field 327 indicates that changes to compensation have not been made. Field 328 in window 326 indicates the total compensation change that has been made. Field 330 indicates the amount of budget remaining for making compensation changes.

Figure 4:
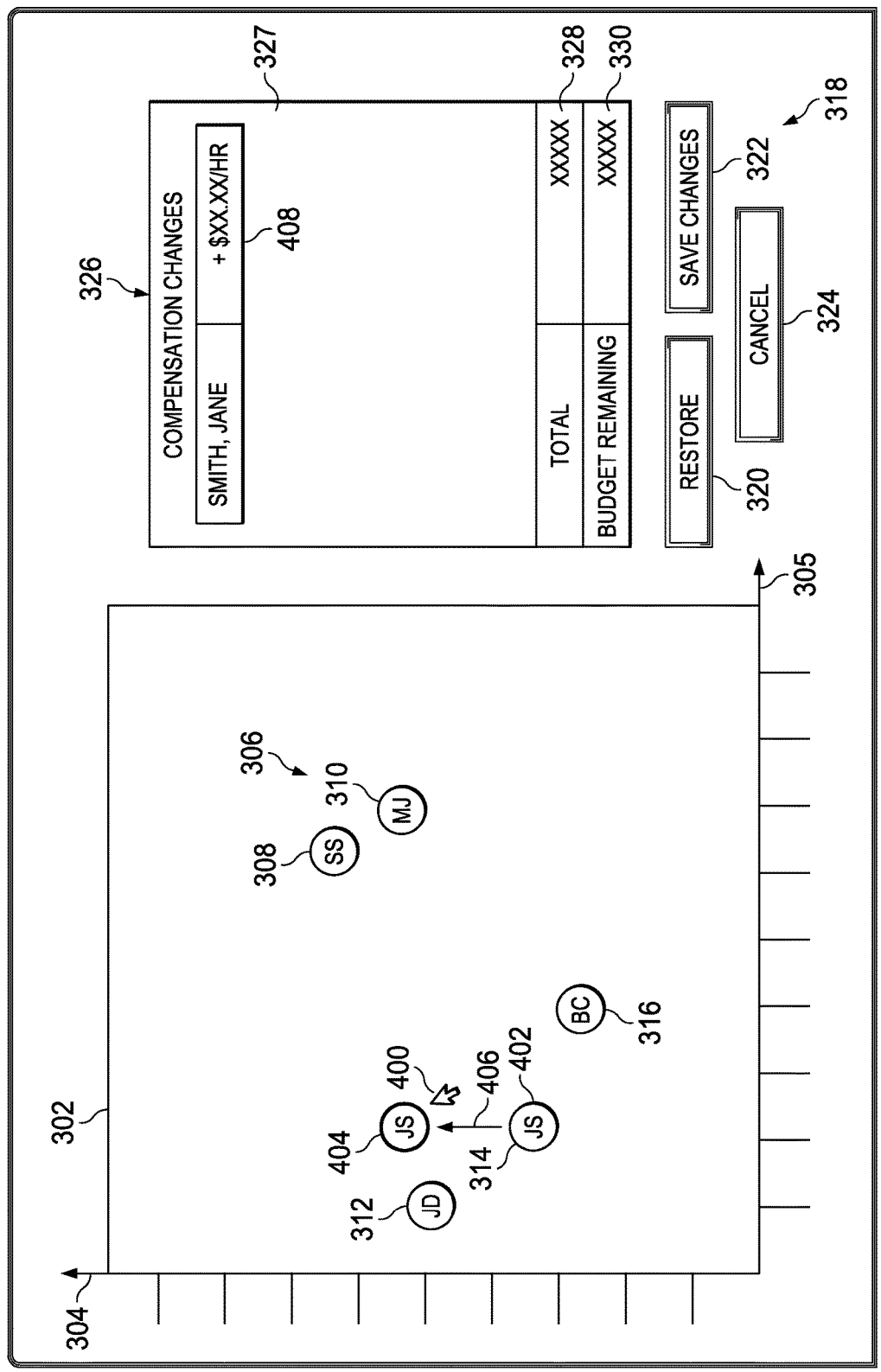
FIG. 4 is an illustration of a graphical user interface for managing compensation in accordance with an illustrative embodiment.

Turning now to FIG. 4, an illustration of a graphical user interface for managing compensation is depicted in accordance with an illustrative embodiment. In this illustrative example, icon 314 has been selected using pointer 400 and moved from original position 402 to new position 404 as indicated by arrow 406. This movement is along compensation axis 304. The movement of icon 314 is performed using a drag-and-drop operation with a user input device controlling pointer 400 in this illustrative example.

This movement of icon 314 increases the compensation for an employee. This increase is a compensation change for the employee represented by icon 314. The compensation change is shown as entry 408 in field 327 in window 326.

Further, a change in the total compensation increases in field 328 and the amount of budget remaining decreases in field 330 based on the compensation change in entry 408.

If the operator desires to save this change, save changes button 322 may be used. In this illustrative example, the compensation change made by moving icon 314 is not stored until the change is saved using save changes button 322. In other words, the compensation change does not take effect until an affirmative action of selecting save changes button 322 occurs in this depicted example.

If the operator desires to undo the change, restore button 320 made be pressed. Using restore button 320 places icon 314 back to original position 402.

Figure 5:
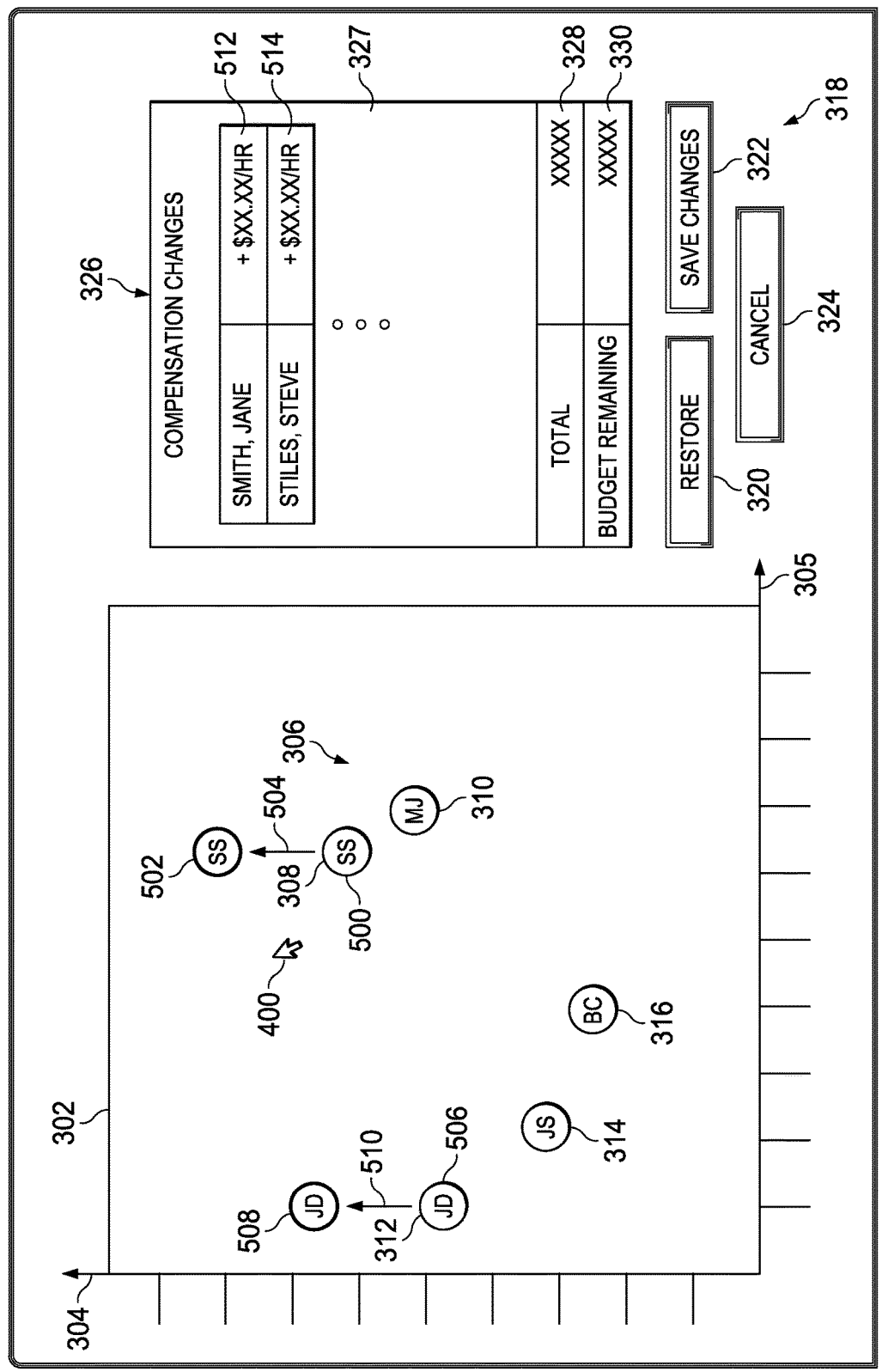
FIG. 5 is an illustration of a graphical user interface for managing compensation in accordance with an illustrative embodiment.

With reference next to FIG. 5, an illustration of a graphical user interface for managing compensation is depicted in accordance with an illustrative embodiment. In this illustrative example, a group of icons 306 has been selected for a compensation change. The selection of the group of icons 306 allows a compensation change to be made to more than one employee at the same time when the group of icons 306 includes more than one icon.

As depicted in this particular example, the group of icons includes two icons, icon 308 and icon 312. These two icons may be selected through user input with pointer 400. In the illustrative example, icon 308 is moved from original position 500 to new position 502 as indicated by arrow 504. Icon 312 is moved from original position 506 to new position 508 as indicated by arrow 510. The movement of icon 308 and icon 312 is along compensation axis 304 in these illustrative examples.

As depicted, both icon 308 and icon 312 are moved at the same time through a single user input. The movement may be performed through dragging and dropping one of the icons, such as icon 308, from original position 500 to new position 502 using pointer 400.

In the illustrative example, the movement of icon 308 and icon 312 results in a compensation change for the two employees associated with these icons. The compensation change is shown as entry 512 and entry 514 in field 327 in window 326.

As depicted, the total compensation in field 328 is incremented and the budget remaining in field 330 is decremented based on the compensation change in entry 512 and entry 514. As another example, when another entry is made moving an icon downwards relative to compensation axis 304, the compensation for that employee represented by the icon is reduced. This reduction in the compensation causes a reduction in the total compensation in field 328 and an increase in the budget remaining in field 330.

As depicted, save changes button 322 may be pressed if all of the compensation changes have been made and the operator desires to make the compensation changes in entry 512 and entry 514 effective for those employees.

Figure 6:
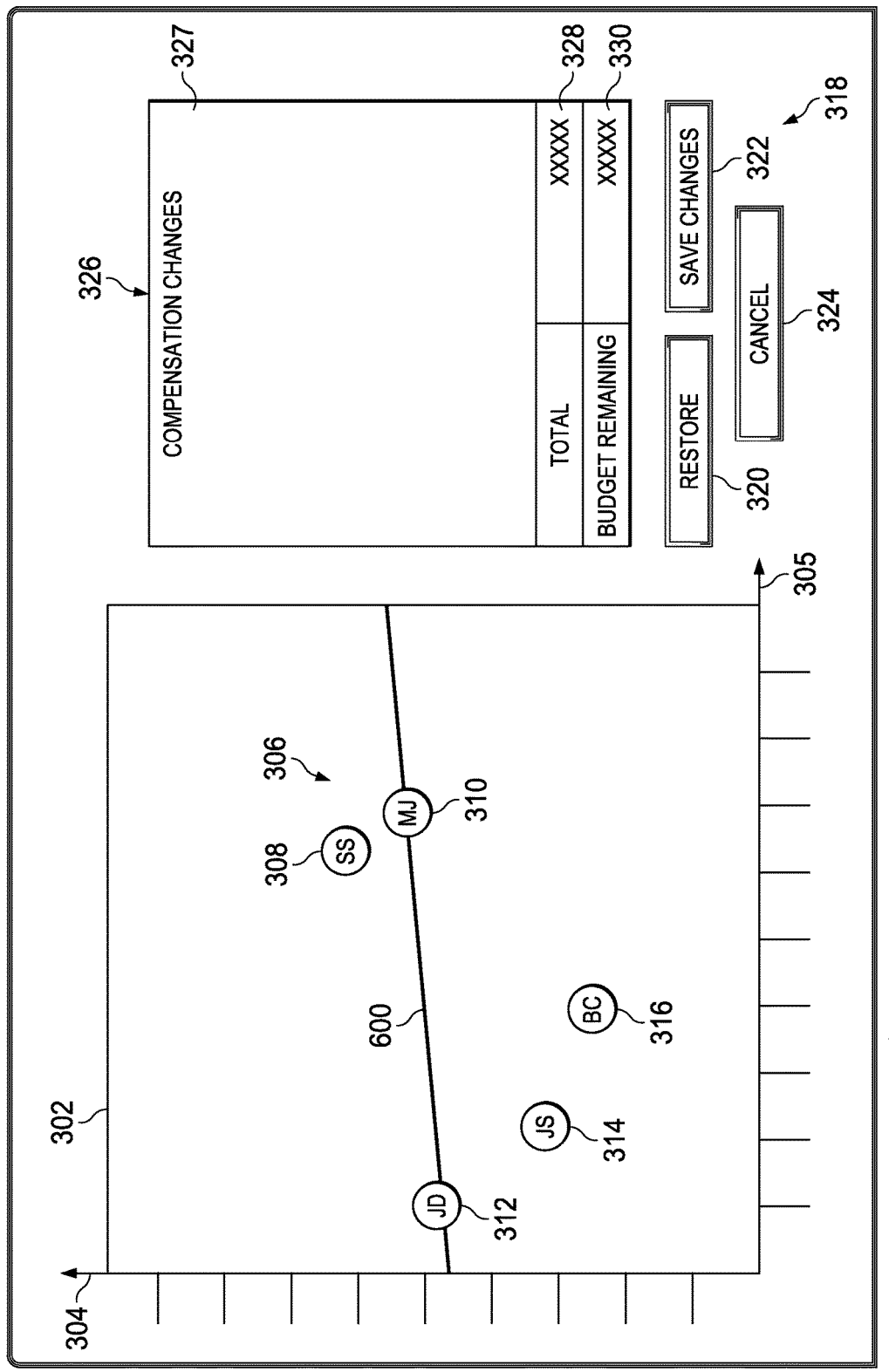
FIG. 6 is an illustration of a graphical user interface for managing compensation in accordance with an illustrative embodiment.

Turning now to FIG. 6, an illustration of a graphical user interface for managing compensation is depicted in accordance with an illustrative embodiment. In this illustrative example, line 600 is displayed within chart 302. Line 600 is shown as a straight line. In other illustrative examples, line 600 may be a curved line, a sine wave, or have other shapes. Line 600 is an example of an implementation for graphical element 212 shown in block form in FIG. 2.

As depicted, line 600 indicates a reference compensation for a comparison metric. Each point in line 600 indicates an amount for a reference compensation for a value for a comparison metric. An operator may attempt to move icons 306 onto or as close as possible to line 600.

For example, the reference comparison may be a target compensation for a particular value of the comparison metric. The target compensation is the amount of compensation desired in this example. In one illustrative example, the operator may use the reference comparison to work within the confines of target compensation. The target compensation may be, for example, a company selected compensation, an industry standard, or based on some other guide or standard.

For example, an organization may have a target amount on total pay or bonuses for employees in the organization. The target amounts may be for the organization as a whole, a division, or some other grouping of employees in the organization.

In one illustrative example, the total amount of money for bonuses for a group of five employees is $20,000. Performance of the group of employees is on a scale from 1 to 5 with a score of 1 being the best. In this illustrative example, employee A in the group has a performance level of 1, Employees B and C both have a performance level of 2, Employees D and E both have performance level of 3.

If the manager gives Employee A $8,000, the compensation tool may automatically calculate that Employees B and C are to receive $4,500 as a bonus, and Employee D and Employee E are to receive $1,500 as a bonus. The compensation tool also may visually display the positions of compensation on the graphical user interface accordingly. Therefore, fairness, more payment for better performance, and the target compensation of a total of $20,000 for the group is achieved using the compensation tool in the illustrative example.

As another example, instead of drawing a reference line, a reference region may be drawn on chart 302. In this example, the reference region may indicate a range of acceptable compensation amounts for particular values of the comparison metric.

As depicted in this example, icon 310 and icon 312 are positioned on line 600. The compensation for these employees is within the target compensation as indicated by line 600. Icon 314 and icon 316 are located below line 600. A compensation increase is appropriate for these employees to move their compensation closer to the target compensation in the illustrative example. Icon 308 is above line 600. As a result, the employee represented by icon 308 may be compensated higher than desired based on the target compensation indicated by line 600.

Figure 7:
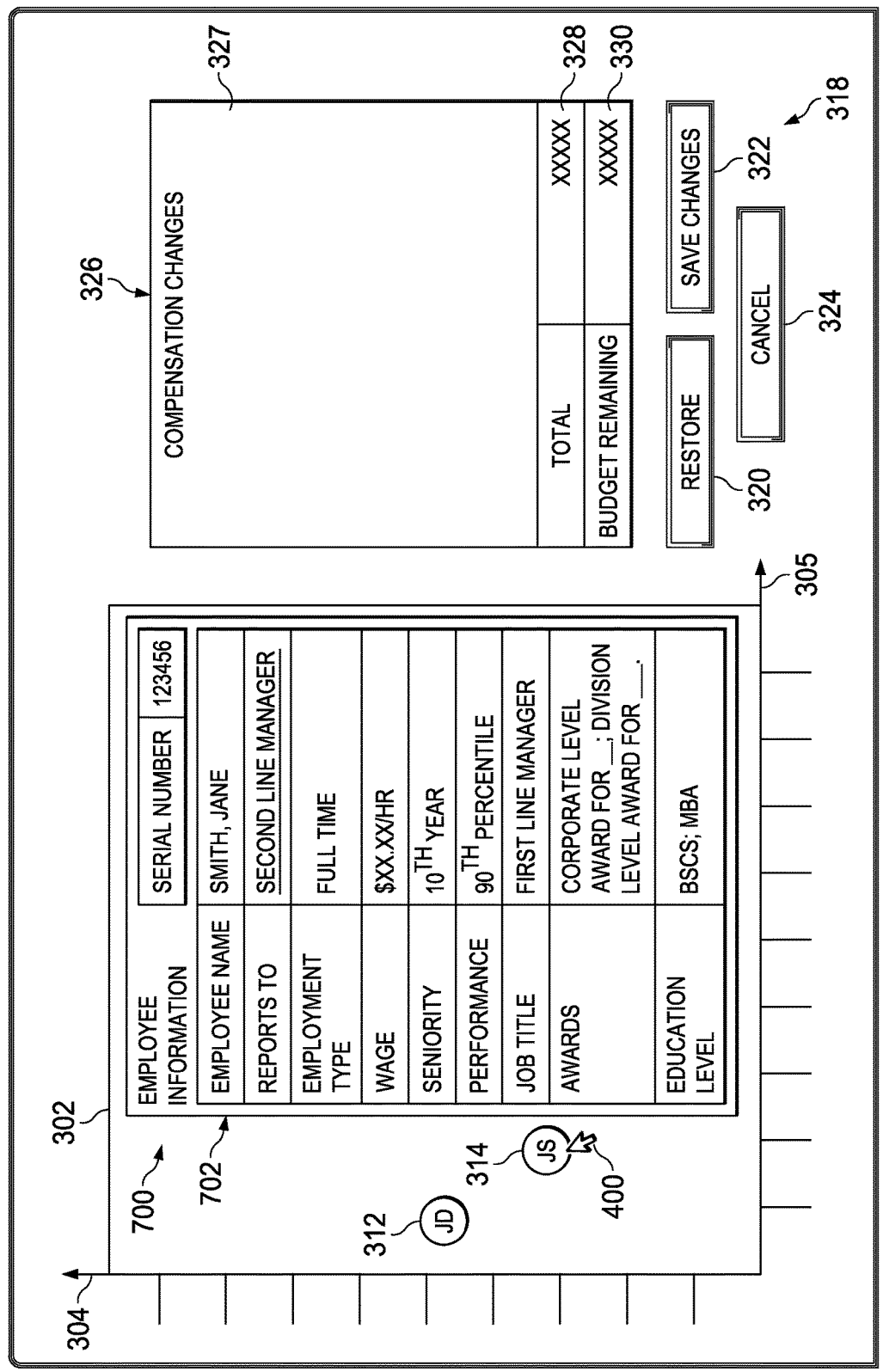
FIG. 7 is an illustration of a graphical user interface for managing compensation in accordance with an illustrative embodiment.

With reference next to FIG. 7, an illustration of a graphical user interface for managing compensation is depicted in accordance with an illustrative embodiment. In this illustrative example, icon 314 has been selected to display employee information.

The selection of icon 314 is made using pointer 400 in this illustrative example. The selection may be made by moving pointer 400 over icon 314 and executing a user input such as pressing a key on a keyboard, clicking a right mouse button, or some other suitable type of user input.

The selection of icon 314 results in window 700 being displayed with employee information 702. In this illustrative example, window 700 is a pop-up window.

Employee information 702 is an example of employee information 113 shown in block form in FIG. 1. As depicted, employee information 702 includes name, reports to, employment type, wage, seniority, performance, job title, awards, and education level. Employee information 702 includes additional information that may be used by the operator in making a decision as to whether or how much of the compensation change should be made for the employee represented by icon 314.

Figure 8:
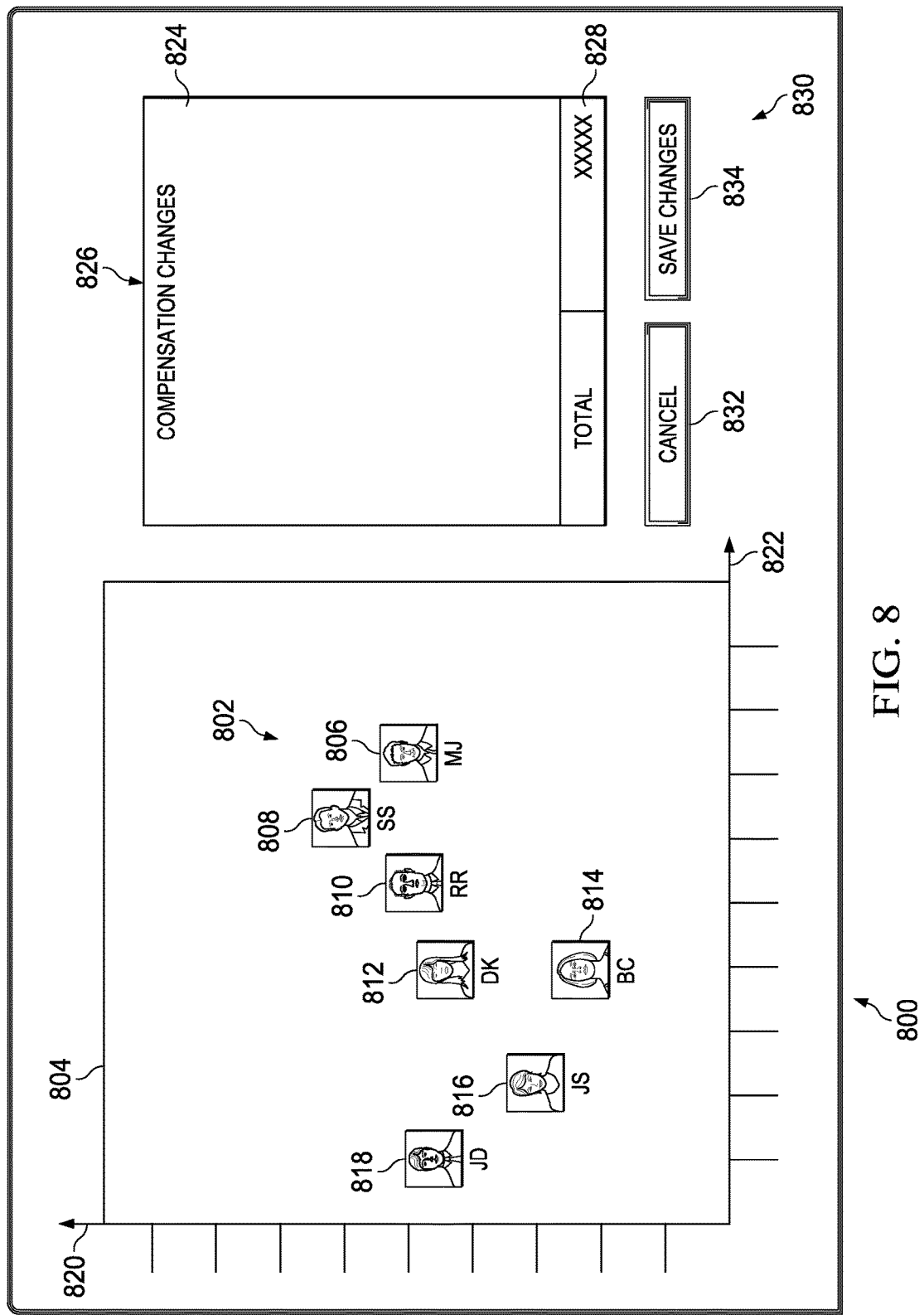
FIG. 8 is an illustration of a graphical user interface for managing compensation in accordance with an illustrative embodiment.

With reference now to FIG. 8, an illustration of a graphical user interface for managing compensation is depicted in accordance with an illustrative embodiment. In this depicted example, graphical user interface 800 is another example of an implementation of graphical user interface 116 shown in block form in FIG. 1.

As depicted, icons 802 are displayed within chart 804 in graphical user interface 800. In this illustrative example, icons 802 include icon 806, icon 808, icon 810, icon 812, icon 814, icon 816, and icon 818. In this illustrative example, icons 802 are in the form of images of the employees with initials of the employees under the images.

In this example, icons 802 are displayed in locations within chart 804 relative to each other. Icons 802 are displayed along compensation axis 820 and comparison axis 822.

As depicted, compensation changes are displayed in field 824 in window 826 in graphical user interface 800. A total of the compensation changes made are displayed in field 828 in window 826.

Graphical user interface 800 also includes controls 830. In this particular example, controls 830 include cancel button 832 and save changes button 834.

Figure 9:
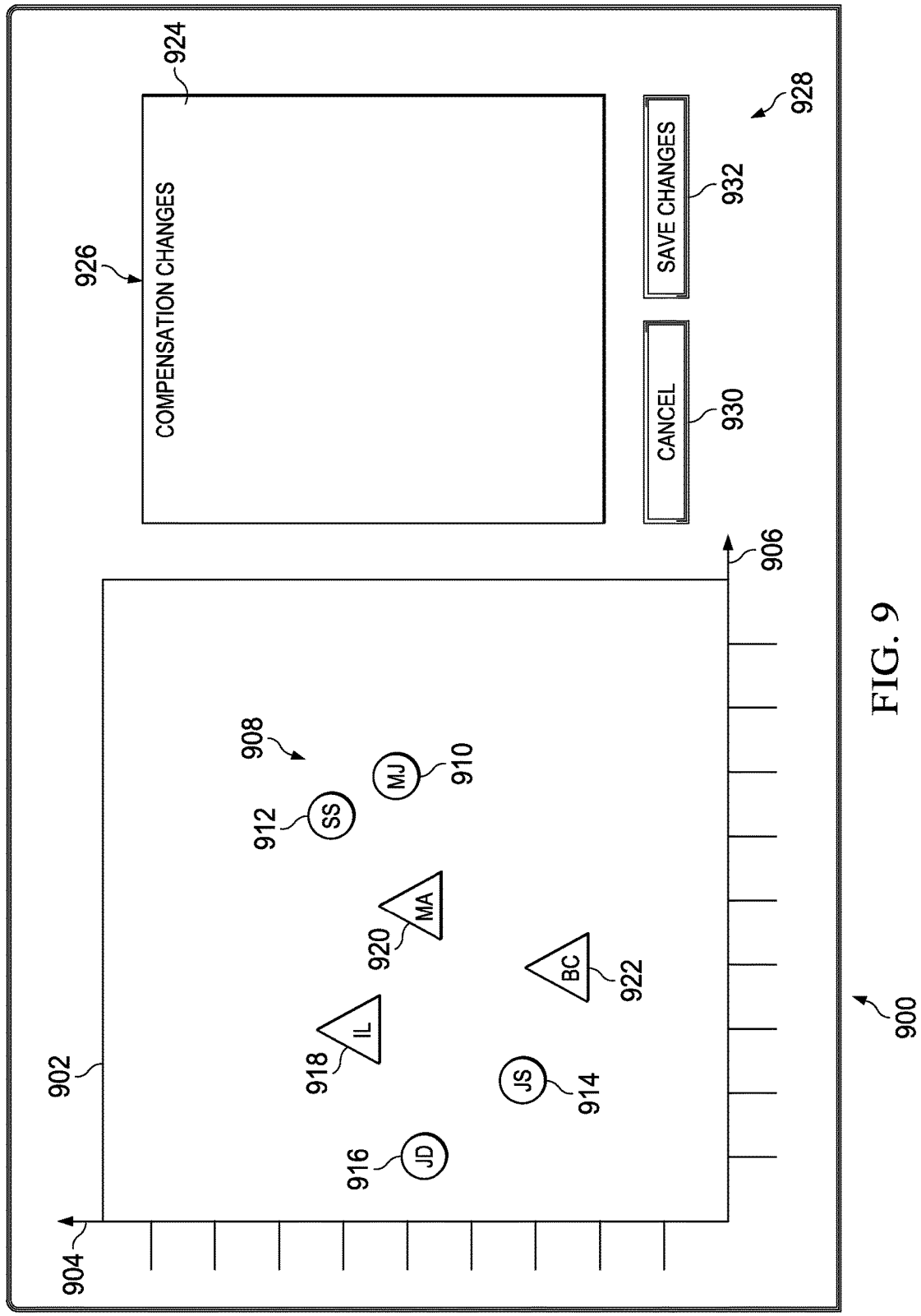
FIG. 9 is an illustration of a graphical user interface for managing compensation in accordance with an illustrative embodiment.

With reference now to FIG. 9, an illustration of a graphical user interface for managing compensation is depicted in accordance with an illustrative embodiment. In this illustrative example, graphical user interface 900 is another example of an implementation of graphical user interface 116 shown in block form in FIG. 1.

As depicted, graphical user interface 900 includes chart 902. In this illustrative example, chart 902 has compensation axis 904 and comparison axis 906.

Icons 908 are displayed within chart 902. In this illustrative example, icons 908 include icon 910, icon 912, icon 914, icon 916, icon 918, icon 920, and icon 922.

In this illustrative example, icons 908 are displayed using geometric shapes with initials of the employees within the geometric shapes. In this illustrative example, different geometric shapes are used. Icon 910, icon 912, icon 914, and icon 916 are circles. Icon 918, icon 920, and icon 922 are triangles. The different shapes may be used to indicate characteristics of the employees. In the illustrative example, the circles may represent employees located in California, while the triangles represent employees located in Nevada. In other illustrative examples, the different shapes may be used to indicate other characteristics such as age groups, groups based on seniority, gender, job types, and other suitable characteristics.

As depicted, compensation changes made to icons 908 may be displayed in field 924 in window 926. Graphical user interface 900 also includes controls 928 in the form of cancel button 930 and save changes button 932.

Figure 10:
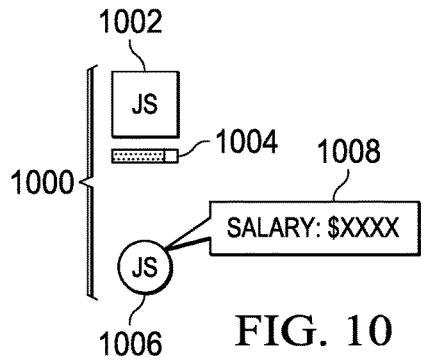
FIG. 10 is an illustration of icons in accordance with an illustrative embodiment.

With reference now to FIG. 10, an illustration of icons is depicted in accordance with an illustrative embodiment. In this illustrative example, icons 1000 are some additional examples of icons that may be used in graphical user interface 300, graphical user interface 800, and graphical user interface 900 as examples of implementations for icons 124 shown in block form in FIG. 1.

As depicted, icon 1002 in icons 1000 shows bar 1004. Bar 1004 may indicate various characteristics about an employee. For example, bar 1004 may indicate how close the employee is to a target compensation. In this illustrative example, bar 1004 is about 80%. As a result, bar 1004 indicates that the employee represented by icon 1002 is at the compensation that is 75% of the target compensation for that employee. In yet other illustrative examples, bar 1004 may indicate performance, seniority, or other characteristics about the employee.

Icon 1006 in icons 1000 includes tooltip 1008. Tooltip 1008 may be displayed when a pointer is moved over icon 1006. In this illustrative example, tooltip 1008 displays a salary for the employee.

The illustration of the graphical user interfaces and graphical elements depicted in FIGS. 3-10 are not meant to imply limitations to the manner in which graphical user interface 116 shown in block form in FIG. 1 may be implemented. For example, controls 318 in FIGS. 3-7, controls 830 in FIG. 8, and controls 928 in FIG. 9 may include other controls in addition or in place of the ones illustrated in these figures. For example, a control may be present that allows an operator to add or remove an employee from the group of employees being compared in the graphical user interfaces in FIGS. 3-9.

As another illustrative example, the graphical elements in the form of icons have been shown as circles, triangles, and images of the employees. Other types of graphical elements may be used. For example, squares, hexagons, pictograms, or other suitable graphical elements may be used for icons to represent employees.

Additionally, although the initials are displayed in association with the icons, names may be displayed in other examples. For example, although the initials are shown as indicators for identifying employees in icons 308, another illustrative example may display pictures of the employees in place of the circles with initials. In another illustrative example, icons may have shapes other than circles. Different shapes may be used to indicate different characteristics of employees. For example, circles may be used to identify managers, squares may be used to identify full-time employees, and triangles may be used to identify part-time employees.

In yet other illustrative examples, other types of graphical indicators may be employed. For example, colors may be used to identify different types of employees or other characteristics. For example, blue may be used to identify employees having a tenure of greater than 10 years while red may be used to identify employees having a tenure of less than 10 years.

In yet another illustrative example, icons may be assigned a color to indicate how close the compensation of the employee represented by the icon is to target compensation. For example, a green icon may indicate that the employee has the compensation that meets the target compensation. Yellow may indicate that the employee is 10% below the target compensation. Red may indicate that the employee is 25% below the target compensation while black may indicate that the employee is 50% or more below target compensation.

In an illustrative example, the icons in FIG. 10 may also include information such as, for example, a bonus, an equity distribution, stock options, or other suitable information. Also, the position of a compensation for an employee displayed in a chart may include only one type of compensation or the compensation may be the total compensation for a period. The type of compensation may be, for example, a salary, a bonus, stock options, or other suitable types of compensation.

In another illustrative example, field 327 may be omitted from window 326 or may be shown in the location in graphical user interface 300. In yet another illustrative example, although bar 1004 is shown as a straight line located under the square in icon 1002, in other implementations the bar may wrap around the square, positioned above the square, or positioned in some other location relative to the square.

In the illustrative example, the graphical user interfaces displayed provide a tool to assist administration of fair compensation. In FIGS. 3-10, the y-axis refers to compensation and the x-axis refers to a comparison metric such as performance level. In this example, the graphical user interface intuitively guides an operator, such as a manager, to provide compensation based on relative performance in the illustrative examples.

Figure 11:
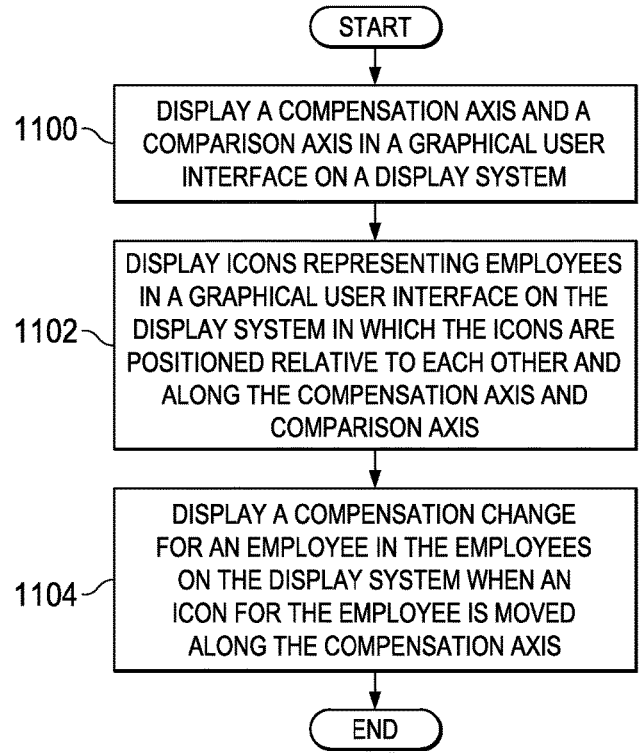
FIG. 11 is an illustration of a flowchart of a process for visualizing compensation on a display system in accordance with the most embodiments.

With reference now to FIG. 11, an illustration of a flowchart of a process for visualizing compensation on a display system is depicted in accordance with an illustrative embodiment. The process illustrated in FIG. 11 may be implemented in compensation environment 100 in FIG. 1. In particular, the process may be implemented using compensation tool 110 in computer system 112 in FIG. 1.

The process begins by displaying a compensation axis and a comparison axis in a graphical user interface on a display system (operation 1100). The process then displays icons representing employees in a graphical user interface on the display system in which the icons are positioned relative to each other and along the compensation axis and comparison axis (operation 1102).

The positions of the icons relative to each other along the compensation axis indicate relative amounts of compensation between the employees. The positions of the icons relative to each other along the comparison axis indicate relative values or scores for a comparison metric. The process then displays a compensation change for an employee in the employees on the display system when an icon for the employee is moved along the compensation axis (operation 1104) with the process terminating thereafter.

Figure 12:
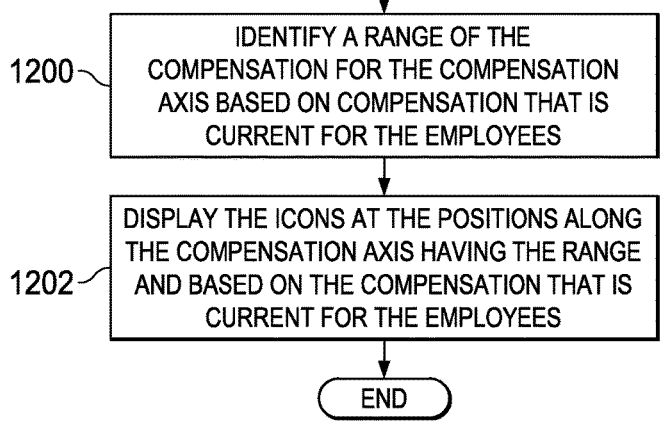
FIG. 12 is an illustration of a flowchart of a process for displaying icons along the compensation axis in accordance with an illustrative embodiment.

With reference next to FIG. 12, an illustration of a flowchart of a process for displaying icons along the compensation axis is depicted in accordance with an illustrative embodiment. The process illustrated in FIG. 12 is an example of an implementation for displaying icons along the compensation axis in operation 1102 in FIG. 11.

The process begins by identifying a range of the compensation for the compensation axis based on compensation that is current for the employees (operation 1200). The process then displays the icons at the positions along the compensation axis having the range and based on the compensation that is current for the employees (operation 1202) with the process terminating thereafter. A similar process may be used to position the icons along the comparison axis.

Figure 13:
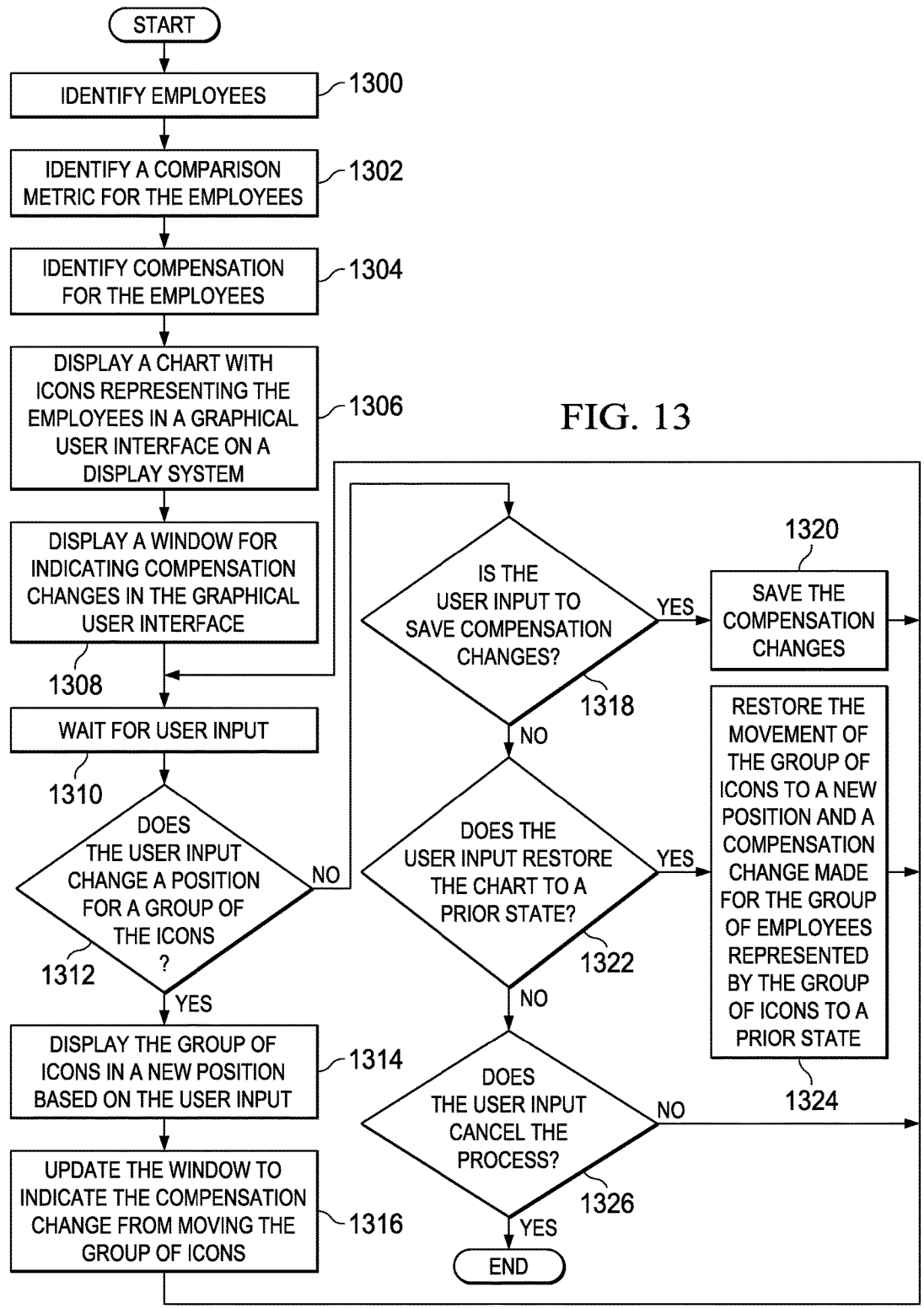
FIG. 13 is an illustration of a flowchart of a process for managing compensation in accordance with an illustrative embodiment.

With reference now to FIG. 13, an illustration of a flowchart of a process for managing compensation is depicted in accordance with an illustrative embodiment. The flowchart in FIG. 13 may be implemented in compensation tool 110 in computer system 112 in FIG. 1.

The process begins by identifying employees (operation 1300). The process then identifies a comparison metric for the employees (operation 1302). The identification of a comparison metric may be one that is preselected or through a user input selecting a metric. In one illustrative example, the metric may be a performance of the employees. The performance may be a score obtained from reviews of employees. The performance of the employees may also be a measure of success of employees in delivering products and services. This measure of success of the employees may be based on at least one of profit margin, customer satisfaction, on time delivery of products and services, or other suitable measures of success.

Of course, other metrics may be used depending on the particular implementation and a blend of metrics may be used to form a comparison metric. For example, performance and seniority may be used. These two metrics may be given weight and those weights may be used to combine or fuse the values for those metrics into a single comparison metric.

The process then identifies compensation for the employees (operation 1304). The process then displays a chart with icons representing the employees in a graphical user interface on a display system (operation 1306). The chart displayed in operation 1306 may include a compensation axis and a comparison axis. The process also displays a window for indicating compensation changes in the graphical user interface (operation 1308).

The process then waits for user input (operation 1310). When a user input is received, a determination is made as to whether the user input changes a position for a group of the icons (operation 1312). If the user input changes the position for a group of icons, the process displays the group of icons in a new position based on the user input (operation 1314). The change in the position for the group of icons is along the compensation axis and does not change along the comparison axis in this illustrative example. Further, the change in the position is for the group of icons. For example, the change in the position may be for a single icon when the group of icons is a single icon. The change in the position may be for two or more icons when the group of icons includes more than one icon.

The process then updates the window to indicate the compensation change from moving the group of icons (operation 1316). The process then returns to operation 1310.

With reference again to operation 1312, if the user input does not change a position for a group of icons, a determination is made as to whether the user input is to save the compensation changes (operation 1318). If the user input is to save the compensation changes, the process then saves the compensation changes (operation 1320). The process then returns to operation 1310. The setting of the compensation changes may be made in a database of the location such that the compensation changes made are implemented when desired.

With reference again to operation 1318, if the user input does not save the compensation changes, a determination is made as to whether the user input restores the chart to a prior state (operation 1322). If the user input restores the chart to a prior state, the movement of the group of icons to a new position and a compensation change made for the group of employees represented by the group of icons are restored to a prior state (operation 1324). The process then returns to operation 1310.

With reference again to operation 1322, if the user input does not restore the chart to a prior state, a determination is made as to whether the user input cancels the process (operation 1326). If the user input cancels the process, the process terminates. Otherwise, the process returns to operation 1310.

Figure 14:
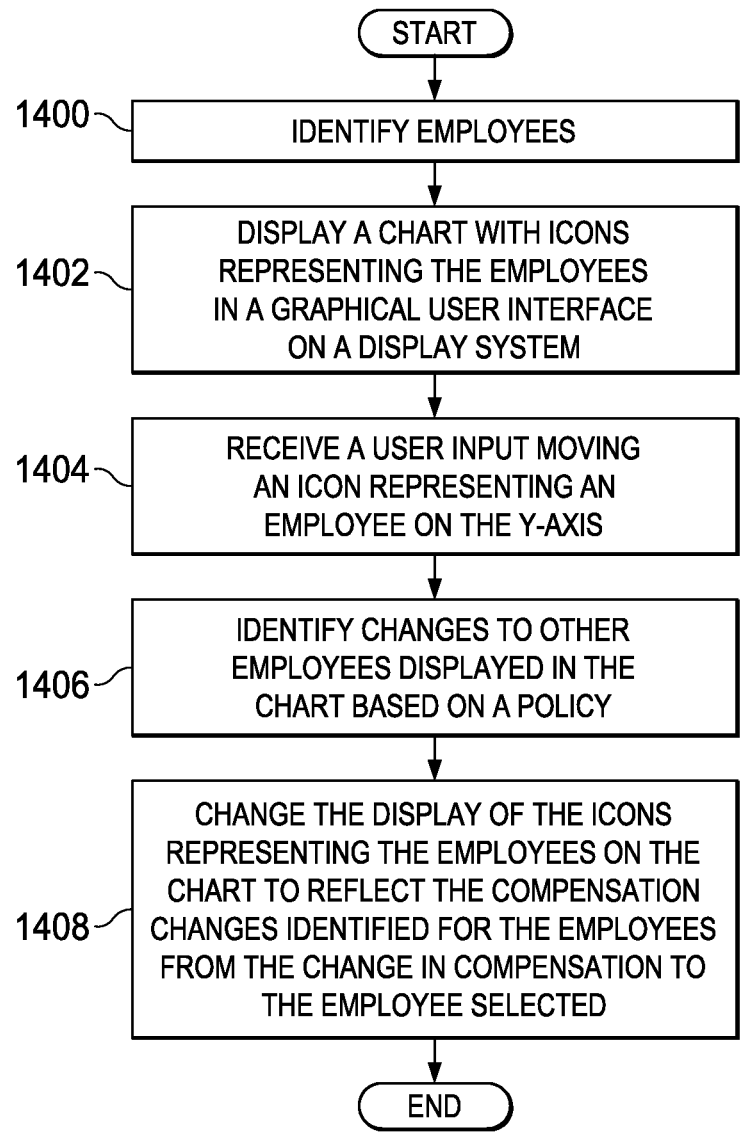
FIG. 14 is an illustration of a flowchart of a process for managing compensation in accordance with an illustrative embodiment.

With reference now to FIG. 14, an illustration of a flowchart of a process for managing compensation is depicted in accordance with an illustrative embodiment. The flowchart in FIG. 14 may be implemented in compensation tool 110 in computer system 112 in FIG. 1.

The process begins by identifying employees (operation 1400). The employees may be identified in a number of different ways. For example, the employees may be identified based on being in a department, having particular job title, having a selected pay scale, or in some other manner. In other examples, the employees may be identified by a user input selecting the employees.

The process then displays a chart with icons representing the employees in a graphical user interface on a display system (operation 1402). In operation 1402, the chart has an x-axis representing compensation and a y-axis representing performance.

The process receives a user input moving an icon representing an employee on the y-axis (operation 1404). In operation 1404, the movement of the employee on the y-axis changes the compensation for the employee.

The process then identifies changes to other employees displayed in the chart based on a policy (operation 1406). The policy in operation 1406 is one or more rules that may be applied to selectively change the compensation of the other employees based on the change to the employee selected in operation 1404.

In operation 1406, the process automatically adjusts compensation across a group of employees with one change in compensation to one employee based on the policy. The change in compensation to the group of employees may not change all of the employees. In some cases, no change may occur to the group of employees in response to the change in compensation for the employee selected in operation 1404 depending on the policy used.

The policy may be, for example, compensation for performance level 1 should not exceed compensation for performance level 2 by 50 percent, performance level 3 should have no more than 50 percent of performance level 2, or some other rule that may be selected for use in adjusting compensation. Further, the process may change the total available amount for compensation changes to conform to the policy selected. For example, the amount of money may be increased or decreased. This change may be reported to the opera, allowing for additional adjustments to be made.

The process changes the display of the icons representing the employees on the chart to reflect the compensation changes identified for the employees from the change in compensation to the employee selected (operation 1408) with the process terminating thereafter. This process may be repeated any number of times to make adjustments in compensation for employees. The compensation changes illustrated in FIG. 14 may be saved. The changes in compensation may then be implemented in how employees are compensated.

The processes in FIGS. 11-14 identifies changes in compensation that may be used in compensating employees in an organization. The compensation changes may be used by, for example, at least one of an accounting department, a payroll department, a human resources department, or some department or personnel to implement the changes made in the process in FIGS. 11-14 such that a real world effect occurs in the manner in which employees are compensated. The changes may be made in a manner that is considered to be fair with respect to the employees using the visualization in a graphical user interface provided by compensation tool 110 in FIG. 1.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, other types of user input may be processed in the flowchart in FIG. 13. For example, a selection of an icon to display employee information may be user input that is received and processed for the display of employee information about employees based on the collection of icons displayed in the chart. In yet another illustrative example, a prompt to save compensation changes may be made if user input is received to cancel the process. When the restore button is selected, a prompt may be made to indicate that compensation changes may be undone or lost.

Figure 15:
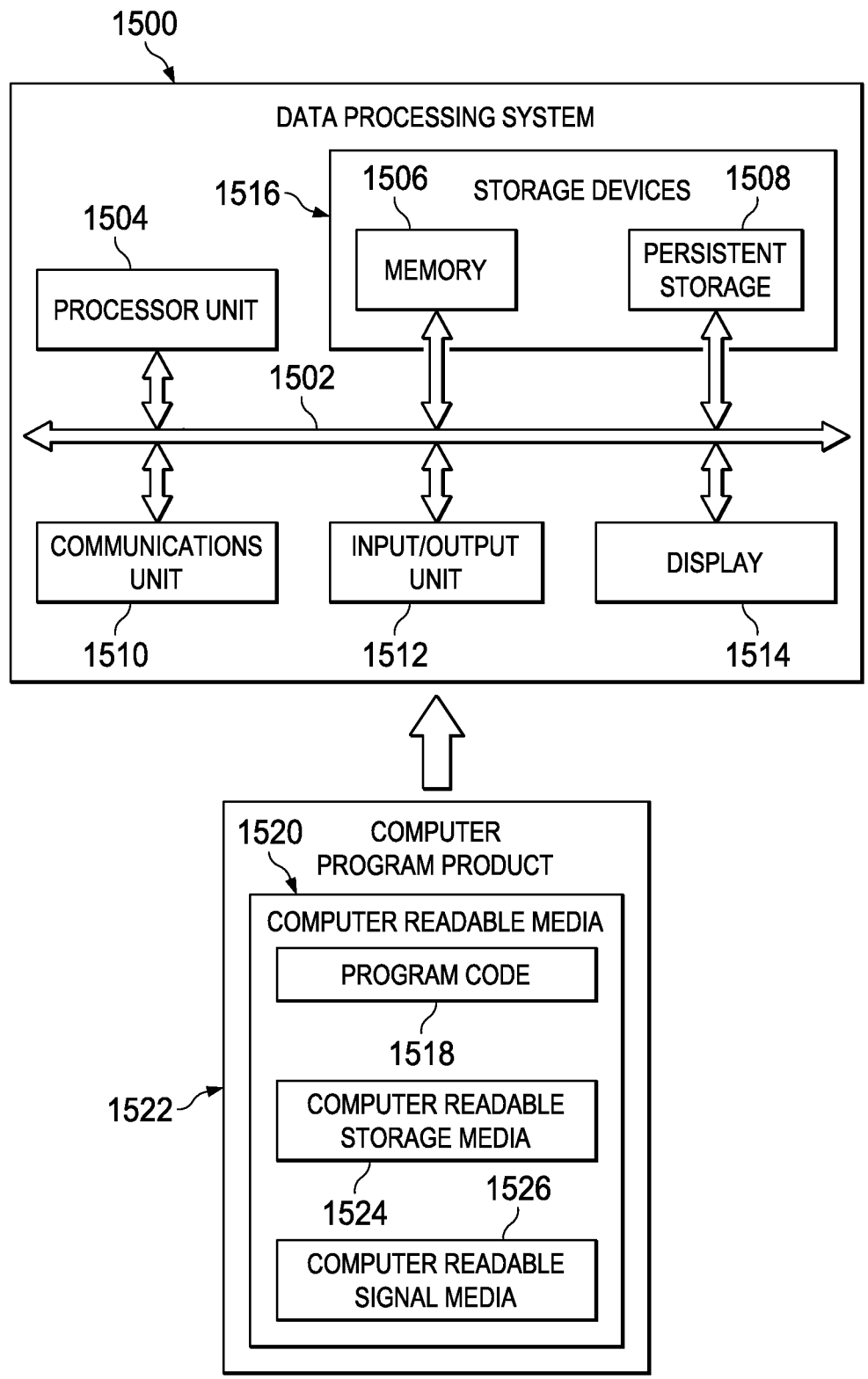
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement one or more data processing systems in computer system 112 in FIG. 1. In this illustrative example, data processing system 1500 includes communications framework 1502, which provides communications between processor unit 1504, memory 1506, persistent storage 1508, communications unit 1510, input/output (I/O) unit 1512, and display 1514. In this example, communication framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these illustrative examples. In one example, computer readable media 1520 may be computer readable storage media 1524 or computer readable signal media 1526.

In these illustrative examples, computer readable storage media 1524 is a physical or tangible storage device used to store program code 1518 rather than a medium that propagates or transmits program code 1518.

Alternatively, program code 1518 may be transferred to data processing system 1500 using computer readable signal media 1526. Computer readable signal media 1526 may be, for example, a propagated data signal containing program code 1518. For example, computer readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

Thus, the illustrative embodiments provide a method and apparatus in which a compensation tool increases an ability to visualize employee information for setting compensation. In the illustrative embodiments, at least one of the visualization or functions in the compensation tool allows for setting compensation in a manner that meets a policy setting fair compensation for employees. The policy may be selected to cause at least one of employee retention, increase employee morale, increase hiring, and other goals for an organization.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising:
    a display system; and
    a compensation tool in the computer system in communication with the display system, wherein the compensation tool displays icons representing employees in a compensation chart of a graphical user interface on the display system, wherein the compensation tool displays employee information about a group of the employees corresponding to a group of the icons displayed in the graphical user interface on the display system when the group of the icons is selected, wherein the compensation tool identifies a comparison metric to compare the employees to each other and the comparison metric is identified through a user input selecting the comparison metric from a plurality of comparison metrics, wherein the icons are positioned relative to each other and along a compensation axis and positions of the icons relative to each other indicates relative amounts of compensation between the employees and displays a compensation change for an employee in the employees as a list entry in a compensation window of the graphical user interface when an icon for the employee is moved along the compensation axis of the compensation chart, wherein the compensation tool increases an ability to visualize the employee information for setting compensation.

2. The computer system of claim 1, wherein in displaying the icons representing the employees in the graphical user interface on the display system, the compensation tool identifies the compensation for the employees and displays the icons for the employees along the compensation axis based on the compensation identified for the employees.

3. The computer system of claim 2, wherein in displaying the icons representing the employees in the graphical user interface on the display system, the compensation tool identifies a range of the compensation for the compensation axis based on the compensation that is current for the employees and displays the icons at the positions along the compensation axis having the range and based on the compensation for the employees.

4. The computer system of claim 1, wherein in displaying the icons representing the employees in the graphical user interface on the display system, the compensation tool displays the icons relative to a comparison axis that is substantially perpendicular to the compensation axis, wherein the comparison axis indicates relative values for the comparison metric.

5. The computer system of claim 1, wherein the compensation tool displays a graphical element in the graphical user interface on the display system, wherein the graphical element is a line indicating a reference compensation for the comparison metric.

6. The computer system of claim 1, wherein the compensation is selected from at least one of a monthly pay, an hourly wage, a total yearly compensation, vacation days, a bonus, an award, health insurance, or life insurance.

7. The computer system of claim 4, wherein the plurality of comparison metrics comprises a seniority, talent, potential growth, performance, experience, location, amount of the compensation change received over a specified time period, amount of time since receiving the compensation change, and a pay grade.

8. A method for managing compensation on a display system, the method comprising:
    receiving, by a computer system, a user input identifying a comparison metric selected from a plurality of comparison metrics, to compare employees to each other;
    displaying, by the computer system, icons representing the employees in a compensation chart of a graphical user interface on the display system, wherein the icons are positioned relative to each other and along a compensation axis and positions of the icons relative to each other indicate relative amounts of compensation between the employees;
    displaying, by the computer system, employee information about a group of the employees corresponding to a group of the icons displayed in the graphical user interface on the display system when the group of the icons is selected; and displaying, by the computer system, a compensation change for an employee in the employees as a list entry in a compensation window of the graphical user interface when an icon for the employee is moved along the compensation axis of the compensation chart.

9. The method of claim 8, wherein displaying, by the computer system, the icons representing the employees in the graphical user interface on the display system comprises:
identifying the compensation for the employees; and
displaying the icons for the employees along the compensation axis based on the compensation identified for the employees.

10. The method of claim 9, wherein displaying, by the computer system, the icons representing the employees in the graphical user interface on the display system;
identifying a range of the compensation for the compensation axis based on the compensation that is current for the employees; and
displaying the icons at the positions along the compensation axis having the range and based on the compensation that is current for the employees.

11. The method of claim 8, wherein displaying the icons representing the employees in the graphical user interface on the display system comprises:
displaying the icons relative to a comparison axis that is substantially perpendicular to the compensation axis, wherein the comparison axis indicates relative values for the comparison metric.

12. The method of claim 8 further comprising:
displaying a graphical element in the graphical user interface on the display system, wherein a graphical element is a line indicating a reference compensation for the comparison metric.

13. The method of claim 8, wherein the compensation is selected from at least one of a monthly pay, an hourly wage, a total yearly compensation, vacation days, a bonus, health insurance, or life insurance.

14. The method of claim 11, wherein the plurality of comparison metrics comprises a seniority, talent, potential growth, performance, experience, location, amount of the compensation change received over a specified time period, amount of time since receiving the compensation change, and a pay grade.

15. A computer program product for displaying compensation on a display system, the computer program product comprising:
a computer readable storage media;
first program code, stored on the computer readable storage media, for receiving a user input identifying a comparison metric selected from a plurality of comparison metrics, to compare employees to each other;
second program code, stored on the computer readable storage media, for displaying, by a computer system, icons representing employees in a compensation chart of a graphical user interface on the display system, wherein the icons are positioned relative to each other and along a compensation axis and positions of the icons relative to each other indicate relative amounts of the compensation between the employees;
third program code, stored on the computer readable storage media, for displaying employee information about a group of the employees corresponding to a group of the icons in the icons in the graphical user interface on the display system when the group of the icons is selected: and
fourth program code, stored on the computer readable storage media, for displaying a compensation change for an employee in the employees as a list entry in a compensation window of the graphical user interface when an icon for the employee is moved along the compensation axis of the compensation chart.

16. The computer program product of claim 15, wherein the second program code comprises:
program code for identifying the compensation for the employees; and
program code for displaying the icons for the employees along the compensation axis based on the compensation identified for the employees.

17. The computer program product of claim 15 further comprising:
fifth program code, stored on the computer readable storage media, for identifying a comparison metric to compare the employees to each other; and
wherein the second program code comprises:
program code for displaying the icons relative to a comparison axis that is substantially perpendicular to the compensation axis, wherein the comparison axis indicates relative values for the comparison metric.

18. The computer system of claim 5, wherein reference compensation is an industry standard compensation for the comparison metric.

19. The method of claim 12, wherein reference compensation is an industry standard compensation for the comparison metric.

20. The method of claim 8 further comprising:
displaying, by the computer system, a compensation budget in the compensation window of the graphical user interface; and
incrementally adjusting, by the computer system, the compensation budget by the compensation change for the employee when the icon for the employee is moved along the compensation axis of the compensation chart.

21. The method of claim 20 further comprising:
displaying, by the computer system, a total compensation adjustment in the compensation window of the graphical user interface; and
incrementally adjusting, by the computer system, the total compensation adjustment by the compensation change for the employee when the icon for the employee is moved along the compensation axis of the compensation chart, wherein the total compensation adjustment is inversely adjusted relative to the compensation budget.

* * * * *